March 26, 1968 B. M. KITCH ET AL 3,374,692
AUTOMATIC TRANSMISSION
Filed Oct. 12, 1964 4 Sheets-Sheet 1
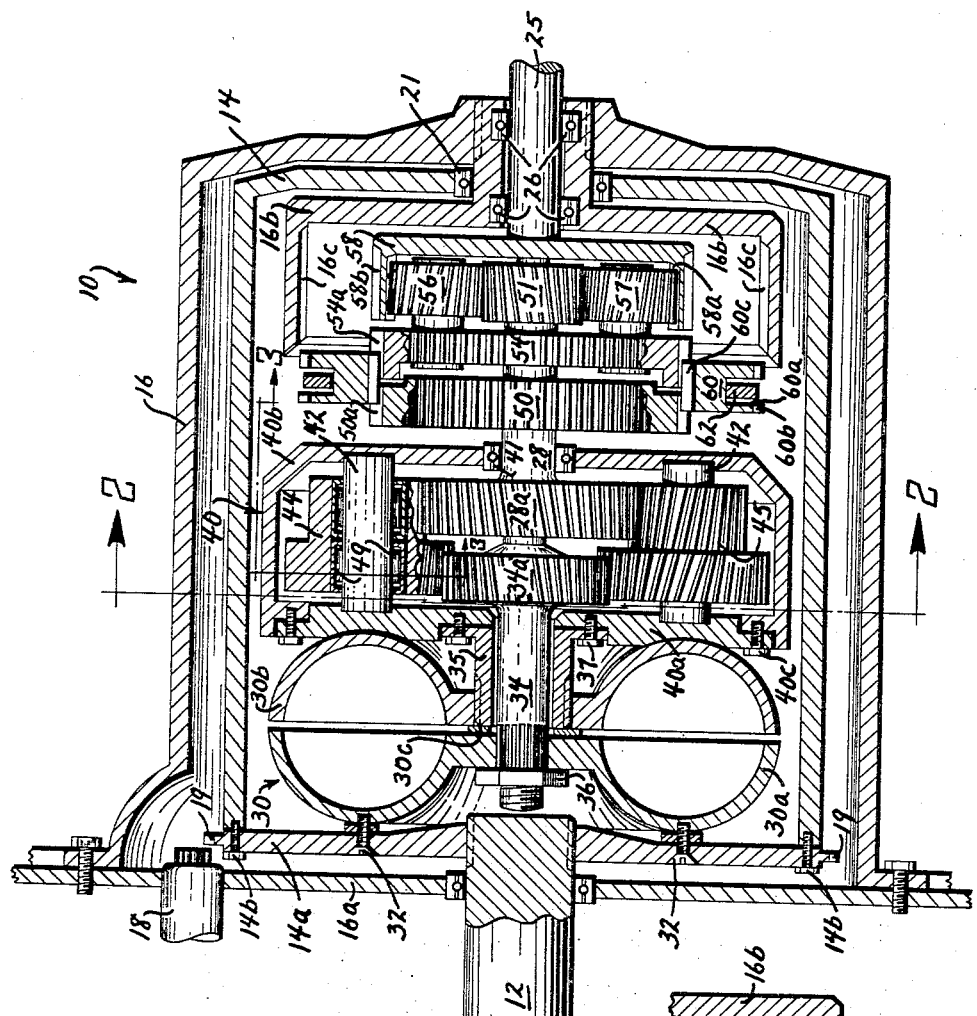
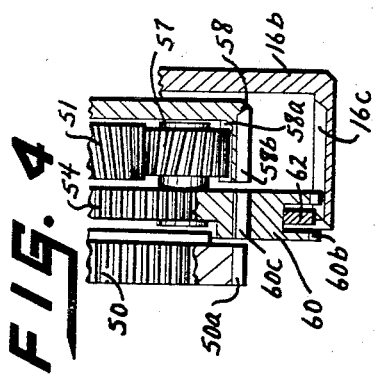
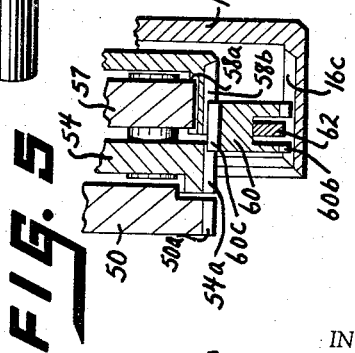
INVENTORS
BENJAMIN M. KITCH
DAVID M. KITCH
BY
*Warren D. Hackbert*
Attorney March 26, 1968  B. M. KITCH ET AL  3,374,692
AUTOMATIC TRANSMISSION Filed Oct. 12, 1964  4 Sheets-Sheet 2

INVENTORS
BENJAMIN M. KITCH
DAVID M. KITCH
BY
Karen D. Hackbert
Attorney

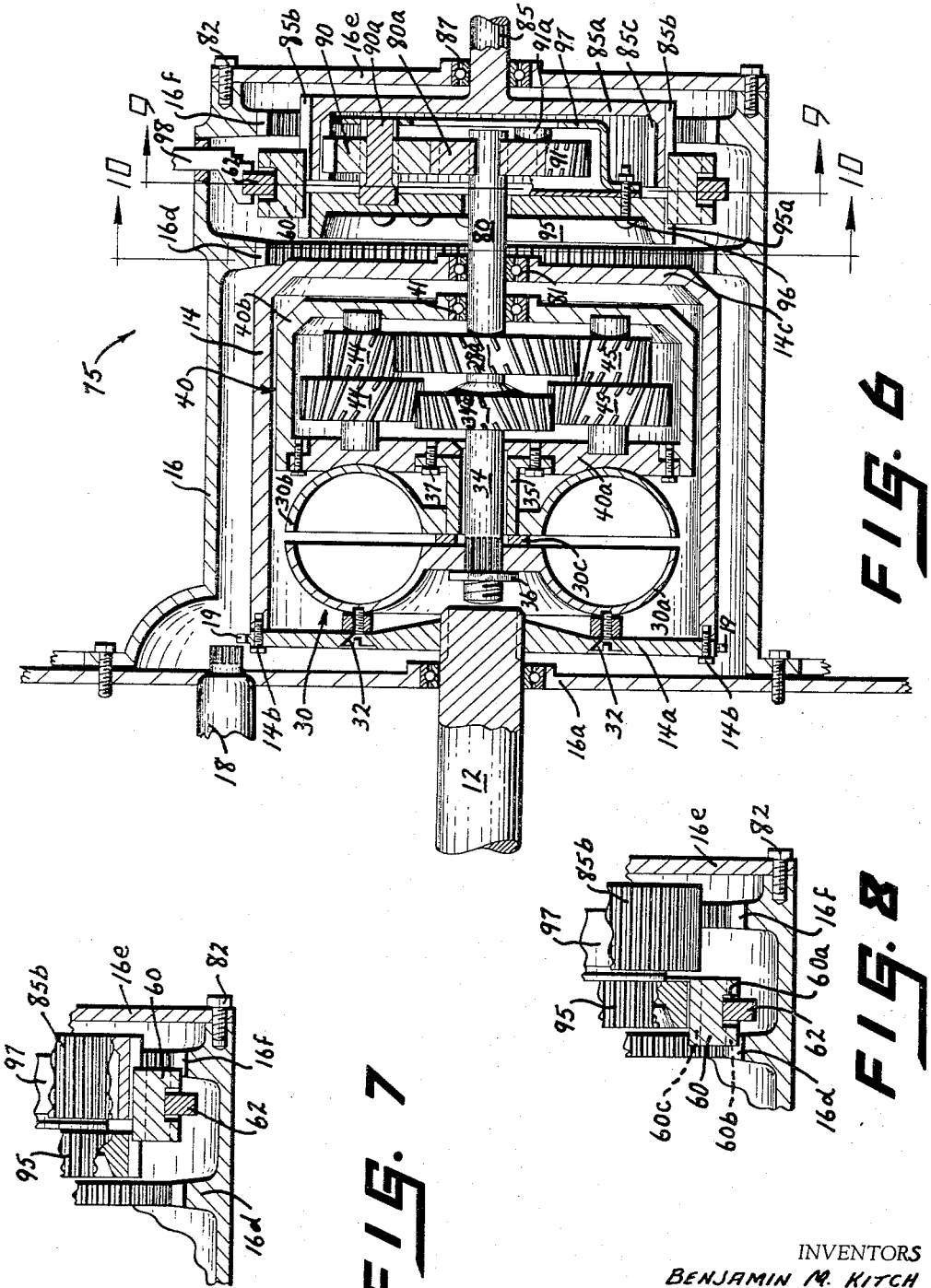

United States Patent Office 3,374,692
Patented Mar. 26, 1968

3,374,692
AUTOMATIC TRANSMISSION
Benjamin M. Kitch, 2563 N. Evans Ave., and David
M. Kitch, 3604 Stringtown, Road, both of Evansville, Ind. 47711
Filed Oct. 12, 1964, Ser. No. 403,047
8 Claims. (Cl. 74—688)

The present invention relates to an automatic transmission, and more particularly to a new and novel automatic transmission for a vehicle which provides a smooth and steady transition from stopping to driving operation without slippage or any shifting gear changes.

As is known, the desirability of automatic transmissions for vehicles is widespread, representing a large part of the automotive market. Many prior automatic transmissions have been considered, where some have been discarded and others adopted for production. A serious drawback to prior automatic transmission approaches has been the mechanical complexities of many, requiring a great number of operative components, and, in the instance of some of the primary developments, not permitting all of the desired functions insofar as vehicle operation is concerned. Moreover, these previous automatic transmissions normally had inherent slippage factors and, additionally, the sensation of shifting gear changes.

By virtue of the instant invention, the applicants herein have provided a new and novel automatic transmission for a vehicle comprising a minimal of functioning operative components which effectively combine together to produce a smooth and steady change from other than a one-to-one gear ratio, i.e. at initial operation looking forward to driving, to a one-to-one driving operation, being representative of smoothness without slippage not available in automatic transmissions now in use.

Briefly, the applicants' invention comprises a set-variable ratio transmission, stepped up to desired performance through induction of a fluid coupling, where desired engine braking is accomplished through mechanical advantage and such fluid coupling. Additionally, the instant automatic transmission has ready provision for the desired engine settings now in common acceptance, viz. a drive position, a reverse position and a parking position, where the over-all unit is representative of highly effective performance and realistic manufacturing economies in achieving same.

Accordingly, the principal object of the present invention is to provide a new and novel automatic transmission for automotive vehicles.

Another object of the present invention is to provide a new and novel automatic transmission for a vehicle broadly describable as a set-variable ratio transmission, stepped up for performance through induction of a fluid coupling.

A further object of the present invention is to provide a new and novel automatic transmission for a vehicle which produces smooth operational transition to normal driving condition, without slippage and/or any shifting gear changes.

A still further and more general object of the present invention is to provide a new and novel automatic transmission for a vehicle having a minimum number of components which are readily assembled with manufacturing economies, and which, at the same time, provide ultimate performance and end results not available in automatic transmissions in use heretofore.

Other objects and a better understanding of the present invention will become more apparent from the following description, taken in conjunction with the accompanying drawings, wherein FIG. 1 is a cross-sectional view along the longitudinal axis of an automatic transmission in accordance with the teachings of the instant invention, where such automatic transmission is in a driving position;

FIG. 4 is another enlarged fragmentary view of the automatic transmission of FIG. 1, in this instance, however, shown in a reversing position;

FIG. 5 is an enlarged fragmentary view showing the applicants' new and novel automatic transmission of FIG. 1 when in parking position;

FIG. 6 is a cross-sectional view along the longitudinal axis of an automatic transmission in accordance with the teachings of an alternative embodiment of the instant invention, where such automatic transmission is in a driving position;

FIG. 7 is an enlarged fragmentary view showing the applicants' new and novel alternative automatic transmission of FIG. 6 when in a parking position;

FIG. 8 is another enlarged fragmentary view of the alternative automatic transmission forming the invention at hand, in this instance, however, shown in a reversing position;

Figure 2:
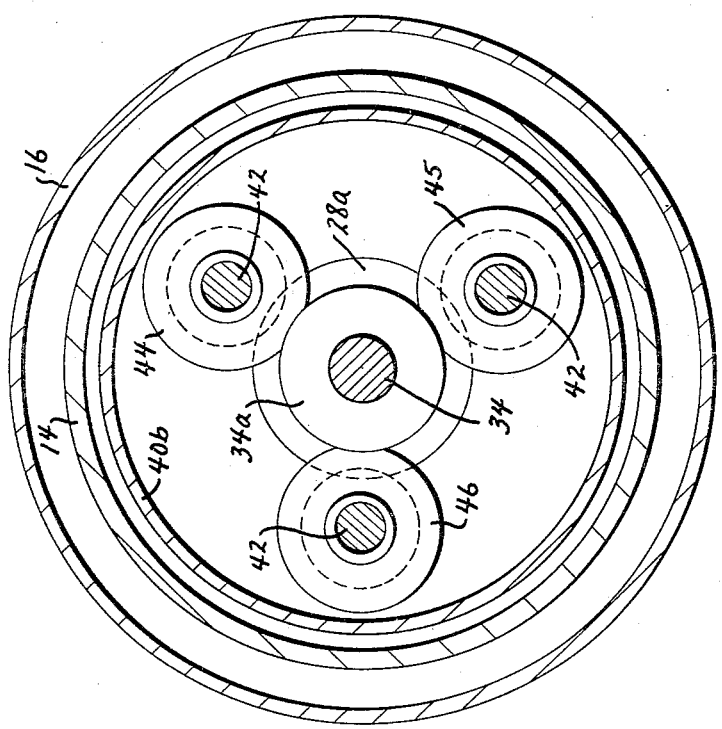
FIG. 2 is a cross-sectional view of a typical gear cluster used in combination with the automatic transmission of FIG. 1, taken at line 2—2 of such figure and looking in the direction of the arrows.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to FIGS. 1 to 5, inclusive, the applicants' new and novel automatic transmission 10 is shown in its customary position between the engine of a conventional automotive vehicle and the rear axle power-imparting arrangement. More particularly, the instant automatic transmission connects to the flywheel of the commonly known internal combustion engine, or a gas turbine engine, through a crankshaft 12. An outer fluid containing drum 14, having a cover member 14a secured to the body of such drum, typically by bolt means 14b, is received at the end of the crankshaft 12, being fixedly secured thereto through conventional splining. The outer drum 14 is adapted to be received within a casing 16, typically mounted on the chassis of the vehicle, where a starter 18, extending through a removable cover member 16a for the casing 16, is selectively engageable with a starter ring gear 19 mounted on the periphery of the drum 14. The starter 18 and starter ring gear 19 arrangement is well known in the art and requires no further discussion herein.

The end of the drum 14 opposite the cover plate 14a rotates around an inwardly angling portion 16b of the casing 16, through conventional bearing members 21, where such inwardly angling portion 16b, having an inner splined surface 16c, fixedly connects with the casing 16 through a spline arrangement. Additionally, the portion 16b surrounds a rotatable drive shaft 25, where, again, sets of bearings 26 permit the ready rotation of the latter.

A fluid coupling 30 is disposed within the outer drum 14 and typically comprises a drive torous 30a and a driven torous 30b, typically spaced-apart by a washer 30c, where each of the latter are in the form of a "doughnut" split in half, i.e. split in a lateral plane with respect to the axis thereof. The drive torous 30a is secured to the plate member 14a of the outer drum 14, as by bolt means 32, so that with rotation of the crank shaft 12, the outer drum 14, including its plate member 14a, and the drive torous 30a all rotate simultaneously.

The drive torous 30a is splined onto a rotatable shaft 34, where a nut 36 typically completes the assembly. On the other hand, the driven torous 30b is typically splined onto a freely rotatable collar 35, where the latter is fixedly secured to an end plate 40a as by bolt means 37. The end plate 40a forms part of a rotatable inner drum 40, being removably secured thereto at 40c, where the inner drum 40 further includes a body portion 40b rotatable, through bearings 41, on another shaft 28. It should be understood that with either transmission embodiment discussed herein, fluid freely communicates from one portion to another, as from the outer drum 14 into the inner drum 40.

Figure 3:
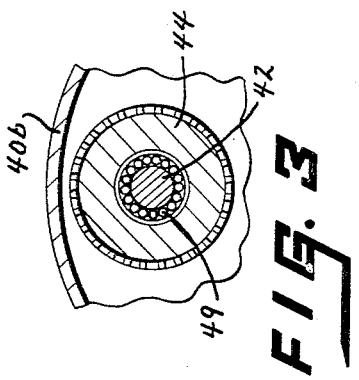
FIG. 3 is another cross-sectional view, showing details of one of the gears making up the aforesaid gear cluster, taken at line 3—3 of FIG. 1 and looking in the direction of the arrows.
Figure 9:
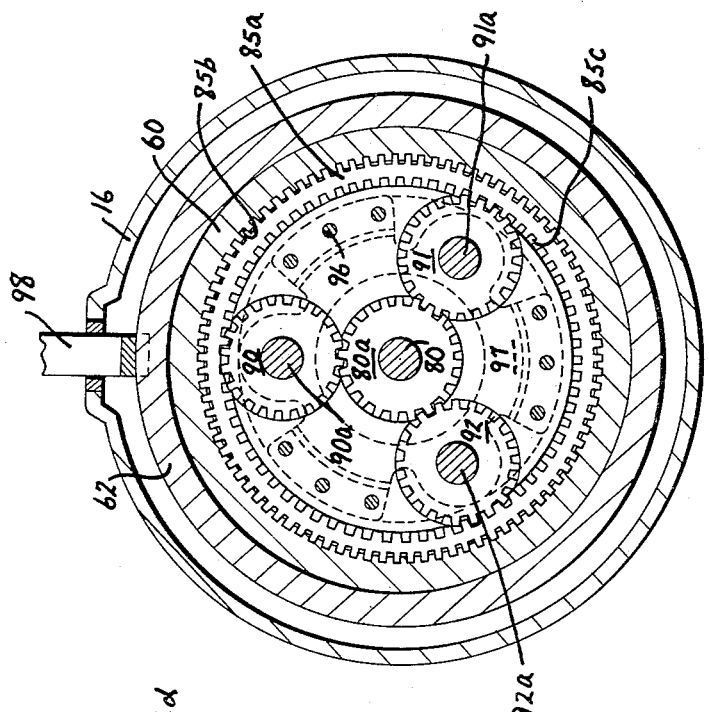
FIG. 9 is a cross-sectional view showing certain details of the gearing arrangement of the alternative automatic transmission of FIG. 6, taken at line 9—9 of such figure and looking in the direction of the arrows.
Figure 10:
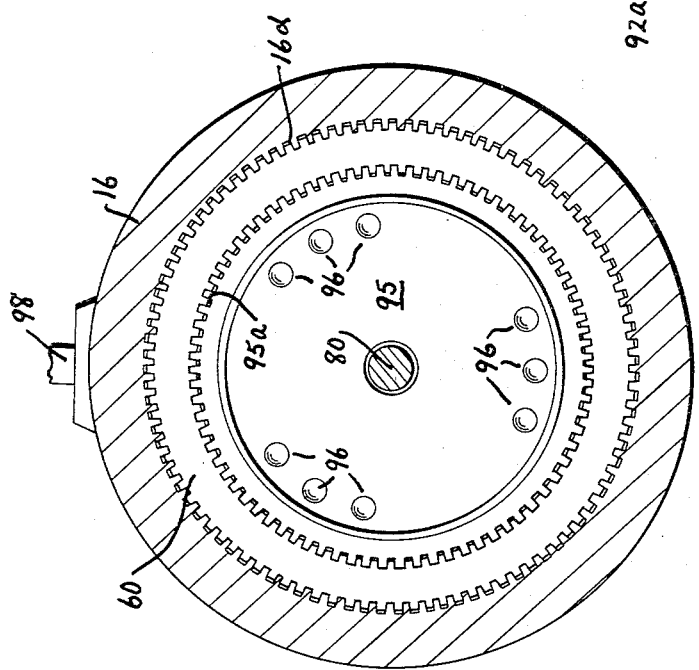
FIG. 10 is another cross-sectional detailed view of the alternative automatic transmission, in this instance taken at line 10—10 of FIG. 6 and looking in the direction of the arrows.

Disposed within the inner drum 40 and rotatable on axles 42 disposed between the end plate 40a and the drum body 40b, are the gears 44, 45 and 46, defining cluster gears, each operable on conventional roller bearing assemblies 49 (see also FIG. 3). A drive gear 34a is fixedly disposed at the end of rotatable shaft 34, engaging the aforesaid cluster gears 44, 45 and 46.

A gear 28a is disposed on the end of the shaft 28, serving as a driven gear, where an interlocking bearing joint (not shown) permits the free rotation of the driven gear 28a on an extension portion on drive gear 34a. The relationship between the cluster gears 44, 45 and 46 and the drive gear 34a and the driven gear 28a, the inner drum 40, the outer drum 14 and the casing 16 is evident from FIG. 2.

Reference is now made to that portion of FIG. 1, as well as FIGS. 4 and 5, showing the control for the instant atuomatic transmission. In this connection, a splined member 50 is also disposed on the shaft 28, as is a drive gear 51. A gear plate 54 freely encircles the shaft 28 between the gears 50 and 51, and rotatably mounted on axles disposed thereon are idler gears 56 and 57, typically three in number (only two of which are shown), which engage the drive gear 51 and a toothed inner surface 58a of a rotatable drum 58. The latter is disposed on the drive shaft 25 and rotates simultaneously therewith, where another interlocking bearing joint (not shown) permits the free rotation of the drive shaft 25 on an extension portion on drive gear 51. The outer surface 50a of the gear 50, the outer surface 54a of the gear plate 54 and the outer surface 58b of the drum 58 are splined, for reasons which should become apparent from the following discussion.

A shifting sleeve 60, having splined outer and inner surfaces, 60b and 60c, respectively, is provided to selectively engage the splined outer surface 50a of the gear 50, the splined outer surface 54a of the gear plate 54, the splined outer surface 58b of the drum 58, and the splined inner surface 16c of the portion 16b of the casing 16. The latter is accomplished in various combinations, depending upon whether the desired control position is for drive, reverse, or park.

As to the shifting sleeve 60, a slot 60a is provided in its periphery for receiving a shifting fork 62, where the latter may assume a semicircular configuration having an extending control handle (not shown). Any desirable means may be employed for the axial shifting of the sleeve 60 through the shifting fork 62, as, for example, and although not shown in FIG. 1 for reasons of drawing clarity, a lever operated pivotal linkage arrangement may extend from the outside through the inwardly angling portion 16b of the casing 16 and out of a cut-out portion thereof to connect to the shifting fork 62, or, by way of further example, through a hydraulic piston which engages the shifting fork 62 for operation.

As to operation, and considering particularly FIG. 1 where the transmission is in drive position, the instant internal combustion engine for a vehicle is initiated in the customary manner, and with the drive shaft 25 held stationary, through braking, as when waiting for the change of a stop light, the crank shaft 12 is rotating at idling speed and the drive torous 30a of the fluid coupling 30 is rotating therewith. The driven torous 30b, due to the forward (or right hand) rotation of the shaft 34 and, hence, the drive gear 34a, and the consequent reverse rotation of the cluster gears 44, 45 and 46 and the fact that gear 28a is held stationary by braking, revolves in a reverse direction with respect to the drive torous 30a, due to the action of the cluster gears 44, 45 and 46 in "walking" around the now stationary gear 28a.

With the operator releasing the brakes and accelerating the engine, the drive torous 30a rotates faster, causing the fluid in the fluid coupling to also rotate faster and, as a result, forward rotating torque is applied to the driven torous 30b. As more acceleration is provided, the driven torous 30b approaches a momentary stationary position, i.e. no longer rotates opposite to the drive torous 30a, and, thereafter, rotates in a positive direction, i.e. in the same direction as the drive torous 30a. At the moment, however, of the aforesaid stationary position, a low gear ratio is applied to the drive shaft 25, through the action of the cluster gears 44, 45 and 46 in their rotating effect on the driven gear 28a, and as the driven torous 30b gains speed, rotation of the cluster gears 44, 45 and 46 is reduced, ultimately coming to the point where they no longer rotate on each of their axes 42. The point of no rotation is representative of a one-to-one gear ratio between the crank shaft 12 and the drive shaft 25, meaning normal driving condition.

As to passing condition, i.e. when one vehicle passes another, the internal combustion engine is made to rotate faster than the inner drum 40, because of its mechanical advantage and instant acceleration, resulting in a downward shifting effect between the driven torous 30b and the drive torous 30a. The aforesaid passing condition remains until the inner drum 40 again catches up with the crank shaft 12 rotation, through fluid coupling 30 action, and rotates at the same speed as the internal combustion engine, representing, once again, driving condition.

As a matter of further attention, it should be understood that in driving condition, the shifting sleeve 60 engages both the splined member 50 and the gear plate 54, making same rotate simultaneously, and, accordingly, the idler gears 56 and 57 on the gear plate 54, driven by drive gear 51, remain in fixed position with respect to the splined member 50, thereby effecting rotation of the drive shaft 25 through the geared relationship between such idler gears and the inner surface 58a of the drum 58.

With particular reference now to FIG. 4, the reverse transmission condition is shown and in such, the shifting sleeve 60 engages only the gear plate 54 and the splined inner surface 16c of the angling portion 16b of the casing 16. With such a relationship, the idler gears 56 and 57 rotate, each on their own axes because of the rotation of driven gear 51 on the shaft 28; however, such rotation is in reverse direction from that of the drive position, meaning that action of the idler gears 56 and 57 on the inner surface 58a of the drum 58 causes the drive shaft 25 to also rotate in a reverse direction, in that the drive shaft 25 and the drum 58 are rotatable together, and on an axial extension of the shaft 28.

In FIG. 5, the position of the shifting sleeve 60 is shown where parking is desired, and, it should be understood that in such position, interconnection is provided between the inner surface 16c of the angling portion 16b of the casing 16, the outer surface 54a of the gear plate 54, and the outer surface 58b of the gear drum 58. All of the preceding components are held in a stationary position because of the relationship with the portion 16b of the casing 16, meaning that the idler gears 55 and 56 are locked against any driving relationship with the drive shaft 25 through the drum 58.

With reference now to FIGS. 6 to 10, inclusive, an alternative embodiment of the applicants' new and novel automatic transmission 75 is shown, wherein, for ease of reference and understanding, like reference numerals are employed to designate components similar to those in the invention embodiment of FIGS. 1 to 5, inclusive. In any event, and as should be evident from the drawings, the fluid coupling 30, as well as the gearing arrangement disposed within the inner drum 40, remains substantially the same as in the earlier figures; however, in this instance, the outer drum 14, which is movable with the crankshaft 12, has an end 14c opposite its cover member 14a rotatable on a shaft 80 through bearings 81. The remainder of the outer drum 14 assembly remains the same, where the preceding changes serve to isolate the basic transmission unit from the controls therefor, and, at the same time, permits easier assembly and servicing.

In the invention embodiment of FIG. 6, the casing 16 is also modified to define an internal peripherally splined portion 16d and, between another cover member 16e secured thereto by bolt means 82, a space for receiving the automatic transmission controls. In this latter regard, a rotatable drive shaft 85 extends through an opening in the cover member 16e, where a bearing 87 permits the ready rotation thereof and provides an effective oil seal.

The drive shaft 85 enlarges into a drum 85a having a splined outer surface 85b and a splined inner surface at 85c, where the latter is selectively intermeshed by rotatable gears 90, 91 and 92 mounted on a recessed plate member 95 at axles 90a, 91a and 92a, respectively. The plate member 95 is fixedly secured, as by bolts 96, to a casing 97 which positions and partly surrounds such gears 90, 91 and 92. The outer surface 95a of the plate member 95 is also splined, as is an internal peripheral portion 16f of the casing 16, for purposes which should become apparent herebelow. The gearing relationship is completed by a gear 80a fixedly secured to the end of the shaft 80, where such gear 80a cooperates with the gears 90, 91 and 92.

The control for the alternative embodiment of automatic transmission includes, as in the earlier invention embodiment, a shifting sleeve 60 having splined outer and inner surfaces, 60b and 60c, respectively, where a slot 60a is provided on its periphery for receiving a shifting fork 62, an eccentric type control member 98 being provided in engagement with the shifting fork 62 to control physical displacement of the shifting sleeve 60 in a longitudinal direction.

The operation of the alternative automatic transmission 75, excepting the control therefor, is similar to that discussed hereabove in connection with the invention embodiment of FIG. 1. In other words, where the transmission is in a driving position, and with the operator releasing the brakes, the drive torous 30a and the driven torous 30b co-act as described herebefore until the cluster gears 44, 45 and 46 no longer rotate on each of their axes 42, at such time being representative of a one-to-one gear ratio between the crankshaft 12 and the drive shaft 25 and indicating a normal driving condition. The earlier discussion as to an accelerating or passing situation is equally adaptable to the invention embodiment of FIG. 6.

Considering, however, the structural relationship of the control arrangement for the various transmission conditions, i.e. driving, reversing, and parking, and with reference first to the driving condition of FIG. 6, the shifting sleeve 60 in this situation integrates the splined outer surface 95a of the plate member 95 and the splined outer surface 85b of the drum 85a, so that such components act as one.

Accordingly, rotation of the gear 80a due to acceleration of the transmission after the release of braking, causes rotation of both the drum 85a and the plate member 95 through the non-rotating gears 90, 91 and 92, providing a solid flow of power through the drive shaft 85. It might be noted that notwithstanding the splined relationship between the gears 90, 91 and 92 and the splined inner surface 85c of the drum 85a, no independent operational movement of the latter is achieved in the driving position because of the interconnecting relationship of the shifting sleeve 60 with the plate member 95 and the drum 85a.

With reference now to FIG. 8, the control is shown in a reversing position for the automatic transmission. More specifically, the shifting sleeve 60 in this instance interconnects the internal peripherally splined portion 16d of the casing 16, as well as the splined outer surface 95a of the plate member 95. In effect, such a relationship permits the gears 90, 91 and 92 to rotate independently on each of their own axes, even though the mounting plate member 95 therefor is fixed in position. The rotation of the gears 90, 91 and 92, through action of the gear 80a on the shaft 80, effects rotation of the drum 85a in a reverse direction, meaning that the drive shaft 85 rotates in a reverse direction, thereby accomplishing the desired over-all reversing movement.

With regard now to FIG. 7, a parking relationship is disclosed therein whereby the shifting sleeve 60 is moved to cause a fixed positioning of the plate member 95 through engagement with the splined outer surface 95a thereof, the drum 85a through engagement with the splined outer surface 85b thereof, and with the internally splined peripheral portion 16f of the casing 16. In other words, no movement is permitted because the drive shaft 85 is locked to the fixed casing 16 in a splined relationship between the drum 85a and the peripheral portion 16f of the casing 16, nor can the plate member 95 rotate because of its fixed relationship with respect to the shifting sleeve 60.

In any event, however, it should be apparent that the basic transmission operation is the same in the invention embodiment of FIGS. 1 and 6; where, however, the principal difference in the FIG. 6 structure is in the control arrangement, and where representative approaches are disclosed herein depending upon particular application or needs.

From the preceding, it should be apparent that the applicants herein have provided a new and novel automatic transmission which is representative of smooth and positive shifting, in all operative positions, with a minimum of functioning components, and, at the same time permits economical assembly and servicing procedures. The instant set-variable ratio transmission further provides break-away power for accelerating, and passing, at any operational speed, as well as desirable engine braking through mechanical advantage and fluid coupling. Moreover, representative control arrangements for the desired operative functions are provided, all combining to afford a highly desirable over-all transmission unit.

The automatic transmission described above is, of course, susceptible to various changes within the spirit of the invention. For example, a fluid iris, similar to an optical iris, may be disposed between the drive portion 30a and the driven portion 30b of the fluid coupling 30 to define a selective neutral position. Moreover, the operation of the shifting sleeve 60 may be controlled through other approaches than those discussed. Further, proportioning may be varied, as well as the number of cluster and idler gears employed in the transmission. Thus, the preceding description should be considered illustrative, and not as limiting the scope of the following claims.

We claim:
1. An automatic transmission comprising a crankshaft connecting to a power source, a rotatable drum connecting to said crankshaft, a fluid coupling disposed within said rotatable drum having a drive portion and a driven portion, said drive portion connecting to and rotating simultaneously with said crankshaft, an inner drum disposed within said rotatable drum, said inner drum connecting to and rotatable simultaneously with said driven portion of said fluid coupling, a rotatable shaft secured to said drive portion of said fluid coupling and having a drive gear disposed thereon within said inner drum, a driven gear disposed within said inner drum on an intermediate axle, a plurality of axles positioned within said inner drum, each axle having a gear disposed thereon in cluster arrangement with said drive gear and said driven gear, said intermediate axle also having a first and a second gear disposed thereon, a plate member encircling said intermediate axle and having a plurality of gears rotatably disposed thereon in operational relationship with said second gear, said plate member having a geared outer surface, a drive shaft having a drum secured thereto in operational relationship with said second gear, said drum having a geared outer surface, a fixed member having a geared inner surface, and clutch-brake means including a slidable operating member which selectively connects the said first gear and the said plate member, the said plate member and the said inner surface of said fixed member, and the said outer surface of said drum, the said plate member and the said inner surface of said fixed member.

2. The automatic transmission of claim 1 where the selective engagement of said slidable operating member with the said first gear and the said plate member represents a driving condition.

3. The automatic transmission of claim 1 where the selective engagement of said slidable operating member with the said plate member and the said inner surface of said fixed member represents a reversing condition.

4. The automatic transmission of claim 1 where the selective engagement of said slidable operating member with the said plate member, the said outer surface of said drum, and the said inner surface of said fixed member represents a parking condition.

5. An automatic transmission comprising a crankshaft connecting to a power source, a fixed casing, a rotatable drum connecting to said crankshaft and disposed within said fixed casing, a fluid coupling disposed within said rotatable drum having a drive portion and a driven portion, said drive portion connecting to and rotating simultaneously with said crankshaft, an inner drum disposed within said rotatable drum, said inner drum connecting to and rotating simultaneously with said driven portion of said fluid coupling, a rotatable shaft secured to said drive portion of said fluid coupling and having a drive gear disposed thereon within said inner drum, a driven gear disposed within said inner drum on an intermediate axle, a plurality of axles positioned within said inner drum, each axle having a gear disposed thereon in cluster arrangement with said drive gear and said driven gear, said intermediate axle also having a drive gear disposed thereon, a plate member positioning cluster gears disposed about said intermediate axle and in operative relationship with said drive gear on said intermediate axle, a drum having a drive shaft forming a part thereof, the outer surface of said plate member and the outer and inner surfaces of said drum being geared, the later inner geared surface of said drum being in operative relationship with said cluster gears, a first portion and a second portion of the inner surface of said fixed casing being geared, and brake-clutch means including a slidable operating member which selectively connects the said plate member and the said drum, the said plate member and the said first geared portion of said fixed casing, and the said plate member, the said drum and the said second geared portion of said fixed casing.

6. The automatic transmission of claim 5 where the selective engagement of said slidable operating member with the said plate member and the said drum represents a driving condition.

7. The automatic transmission of claim 5 where the selective engagement of said slidable operating member with the said plate member and the said first geared portion of said fixed casing represents a reversing condition.

8. The automatic transmission of claim 5 where the selective engagement of said slidable operating member with the said plate member, the said drum and the said second geared portion of said fixed casing represents a parking condition.

References Cited

UNITED STATES PATENTS

| | | | |
|---|---|---|---|
| 1,242,974 | 10/1917 | Pinckney | 74—688 |
| 2,129,884 | 9/1938 | Swan | 74—688 |
| 2,162,803 | 6/1939 | England | 74—677 |
| 2,251,170 | 7/1941 | Seybold | 74—688 |
| 2,319,706 | 5/1943 | Reit | 74—688 |
| 2,366,063 | 12/1944 | Seybold | 74—688 |
| 2,409,196 | 10/1946 | Cunningham | 74—688 |
| 2,416,311 | 2/1947 | Hanson | 74—688 |
| 2,448,249 | 8/1948 | Bonham | 74—792 X |
| 2,559,922 | 7/1951 | Alspaugh | 74—688 X |
| 2,575,522 | 11/1951 | McFarland | 74—792 X |
| 2,679,169 | 5/1954 | Duffield | 74—688 X |
| 2,910,893 | 11/1959 | Peras | 74—792 |
| 3,171,299 | 3/1965 | Miner | 74—688 X |

FOREIGN PATENTS

| | | |
|---|---|---|
| 450,953 | 4/1935 | Great Britain. |
| 539,386 | 9/1941 | Great Britain. |
| 539,583 | 9/1941 | Great Britain. |
| 252,659 | 1/1948 | Switzerland. |

DONLEY J. STOCKING, *Primary Examiner.*

DAVID J. WILLIAMOWSKY, ARTHUR T. McKEON, *Examiners.*

J. R. BENEFIEL, *Assistant Examiner.*